Dec. 19, 1933. E. E. DAVIDSON 1,939,878
METHOD OF MAKING WEATHER STRIPPING
Filed June 5, 1931
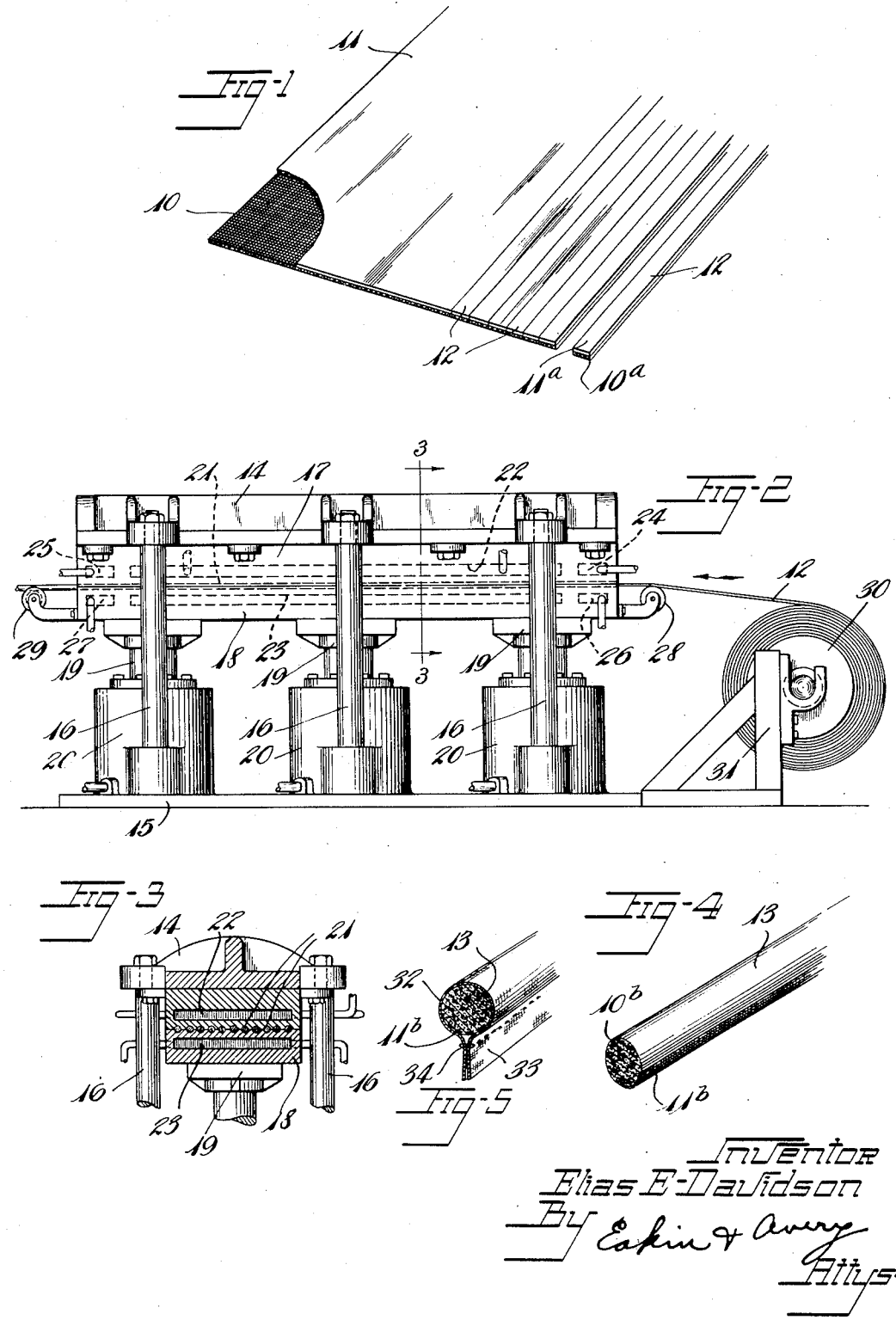

Patented Dec. 19, 1933

1,939,878

UNITED STATES PATENT OFFICE 1,939,878

METHOD OF MAKING WEATHER STRIPPING

Elias E. Davidson, Akron, Ohio, assignor to The B. F. Goodrich Company, New York, N. Y., a corporation of New York Application June 5, 1931. Serial No. 542,243

4 Claims. (Cl. 18—59)

This invention relates to stripping of the type generally classifiable as weather stripping, including windlace stripping and gasket stripping, and to procedure for producing the same.

Among the objects of the invention are to provide improved procedure for making such stripping economically and rapidly, and to provide economically for the desired durability, resilience and uniform quality in the product. More specific objects are to provide for making the stripping of resilient sponge rubber, with provision for economically but effectively reinforcing the rubber against damage from the pulling stresses of handling, both during the stage of manufacture and after completion of the product, and further to provide for such reinforcement without sacrifice of the desired resilience and flexibility in the product and without dependence upon an enclosing cover alone for resistance to the pulling stresses.

These and further objects will be apparent from the following description, reference being had to the accompanying drawing in which:

Fig. 1 is a fragmentary perspective view, partly in section and partly broken away, of assembled strip-forming materials at a stage in the procedure of the invention.

Fig. 2 is a view in elevation of a vulcanizing press for molding the stripping.

Fig. 3 is a transverse section of the press taken along the line 3—3 of Fig. 2.

Fig. 4 is a fragmentary view in perspective and cross section, of a strip as it appears after the molding operation.

Fig. 5 is a view similar to that of Fig. 4 but showing the strip incased in a cover.

In the practice of the invention according to the preferred manner a long length strip or sheet of reinforcing material, such as square-woven fabric, indicated at 10 in Fig. 1, is first provided with a facing layer 11 of unvulcanized rubber composition containing a blowing agent, this layer being applied in any suitable manner, such as by calendering the rubber onto the fabric. The laminated structure thus formed is then severed along longitudinally extending, parallel lines to make a plurality of relatively narrow, long length strips 12 each having a fabric backing 10a and a facing layer 11a of the rubber composition which contains a blowing agent. Each strip 12 is then progressively passed through a mold cavity of suitable shape where it is subjected to heat, causing the rubber layer 11a by the action of the blowing agent, to be expanded to fill the mold cavity. The fabric 10a during this operation is caused to conform itself to the outer surface of the strip in secure adhesion with the rubber.

The strip 12 may be of considerably less cross sectional area than that of the cavity in which it is molded and the cross sectional shape of the final product may be quite dissimilar to that of the strip 12, inasmuch as the rubber 11a is caused, under the heat of molding, by its contained blowing agent, to expand considerably and fill out uniformly to the shape of the mold cavity. In the illustrated embodiment the strip 12 is cut substantially rectangular in cross section and a mold is used having a cavity of such shape as to produce a strip, indicated at 13 in Fig. 4, which is circular and considerably enlarged in cross section.

The fabric 10a is caused to take the arcuate form 11b substantially flush with the surface of the cylindrical strip 13, in vulcanized adhesion with the rubber, and due to the action of the blowing agent the rubber is made cellular, as indicated at 10b with the desired yieldability and resilience. Due to the considerable enlargement of the rubber, the narrow fabric strip becomes a relatively small part of the final structure, and while constituting an adequate longitudinal reinforcement for the unvulcanized rubber 11a and the spongy vulcanized rubber 10b, which are of comparatively low tensile strength, this fabric does not materially lessen the resilience or flexibility of the final product.

A suitable apparatus for molding the stripping progressively along its length is illustrated in Figs. 2 and 3. A press head 14, supported in spaced relation over a base 15 by vertical columns 16, 16, is provided at its under side with an elongated upper mold platen 17. A lower mold platen 18 is supported at the upper ends of a plurality of rams 19, 19 of pressure cylinders 20, 20 which may be operated to raise and lower the platen 18 into and out of engagement with the upper platen 17. The faces of the mold platens are formed with a plurality of parallel pairs of opposing semi-circular grooves extending longitudinally of the platens throughout their length, these pairs of grooves in the closed position of the press constituting cylindrical mold cavities 21, 21 each of a diameter desired for the molded product.

The platens 17 and 18 are internally recessed throughout their central regions as indicated at 22 and 23 for the circulation of a heating fluid, and the end portions of these platens are internally recessed, as indicated at 24, 25, 26 and 27 for the circulation of a cooling fluid, suitable piping connections being provided for supplying and removing the fluid. Expansion of the rubber of a strip contained in a cavity of the mold is thus confined longitudinally to the intermediate heated region of the platens, the cooled end portions of the platens preventing expansion of the rubber at the unconfined ends of the cavity. Guide rollers 28 and 29 are preferably provided at the ends of the lower platen 18 to facilitate feeding of the stripping.

After severing the strip 12 from the main laminated sheet, the strip may be wound on a reel, such as that indicated at 30, and this reel may be mounted for rotation on a supporting structure 31 adjacent the receiving end of the mold press. A length of the strip 12 is then fed from the reel over guide roller 28 and into one of the mold cavities 21, the press platens being separated. The press is then closed and the heat of the intermediate region of the platens causes the rubber to expand to the cylindrical shape of the mold cavity while the cooled ends of the platens limit the longitudinal extent of the expansion of the strip. Sufficient time is permitted to elapse for the rubber composition to expand and preferably become completely vulcanized, when cylinders 20, 20 are operated to lower rams 19, 19 and the lower platen to permit easy feeding of the strip 12. The strip is then fed forward from reel 30 sufficiently for the reach of the strip immediately following that which has just been molded to be exposed to the heated zone of the platens, when the lower platen is raised for another molding operation, the strip being so positioned longitudinally of the mold as to give it substantially uniform vulcanization throughout the end regions of the successive cures. By repeating the cycles of this intermittent operation a strip of considerable length may be progressively molded and vulcanized, and as a number of strips may be accommodated simultaneously in the multi-cavity press it will be seen that the procedure is rapid and economical.

It has been found that with but a single longitudinally extending strip of fabric 11b, the integrity of the sponge rubber under ordinary handling is adequately preserved, but if desired a second strip of fabric may be united with the rubber in diametrical opposition to the strip 11b. This may readily be accomplished by applying a second layer of fabric to the upper surface of the rubber composition 11 of the laminated sheet of Fig. 1 and by severing and molding the resulting structure according to the procedure above described.

After the molding operation the strip may be reeled in long length, from which short lengths may be cut off as needed without waste. For the purpose of ornamentation, protection, or of facilitating attachment, the stripping of Fig. 4 may be incorporated in a cover of fabric or other material, as indicated at 32 in Fig. 5, and the attaching flaps 33 of the cover may be secured in any suitable manner, such as by cementing or by the stitching 34.

Variations may be made without departing from the scope of the invention as it is defined in the following claims.

What is claimed is:

1. The method of making weather stripping which comprises coating a sheet of reinforcing material with rubber composition containing a blowing agent, severing a laminated strip from the coated sheet, feeding the laminated strip through a space between mold surfaces and vulcanizing the strip in said space and thereby causing the rubber to expand and fill the space.

2. The method of making weather stripping which comprises providing on one face of a narrow strip of reinforcing material a coating of rubber composition containing a blowing agent, feeding the coated strip through a mold space of greater width and depth than the coated strip, and vulcanizing the strip in the said space and thereby causing the rubber to expand and fill the space.

3. The method of making weather stripping which comprises coating a sheet of reinforcing material with rubber composition containing a blowing agent, severing a laminated strip from the coated sheet, placing the laminated strip in a mold space of greater width and depth than the laminated strip, and by means of the blowing agent causing the rubber to expand and fill the space.

4. The method of making weather stripping which comprises coating a sheet of fabric with rubber composition containing a blowing agent, and producing therefrom a plurality of fabric-reinforced strips, in which the exposed surface area of the rubber predominates, by separating the structure into composite strips and mold-expanding the coating in association with the fabric.

ELIAS E. DAVIDSON.